United States Patent [19]

Hosch

[11] Patent Number: 5,058,723
[45] Date of Patent: Oct. 22, 1991

[54] APPARATUS FOR SELECTIVELY DISCHARGING ARTICLES FROM A CONVEYOR SYSTEM

[75] Inventor: Michael A. Hosch, Oconomowoc, Wis.

[73] Assignee: Dorner Mfg. Corp., Hartland, Wis.

[21] Appl. No.: 466,062

[22] Filed: Jan. 16, 1990

[51] Int. Cl.[5] ............................................. B65G 47/46
[52] U.S. Cl. ................................ 198/372; 198/479.1; 198/832.1
[58] Field of Search ...................... 198/372, 457, 479.1, 198/598, 832.1

[56] References Cited

U.S. PATENT DOCUMENTS

| | | | |
|---|---|---|---|
| 1,064,194 | 6/1913 | Carroll | 198/479.1 |
| 2,072,840 | 3/1937 | Temple | 198/832.1 |
| 4,057,138 | 11/1977 | Grebe | 198/372 |
| 4,110,214 | 8/1978 | Pfeffer | 198/832.1 |
| 4,765,940 | 8/1988 | Circelli et al. | 198/457 |

FOREIGN PATENT DOCUMENTS

| | | | |
|---|---|---|---|
| 644688 | 1/1979 | U.S.S.R. | 198/548 |
| 704866 | 12/1979 | U.S.S.R. | 198/598 |
| 874527 | 10/1981 | U.S.S.R. | 198/372 |

Primary Examiner—Joseph E. Valenza
Attorney, Agent, or Firm—Andrus, Sceales, Starke & Sawall

[57] ABSTRACT

A high speed apparatus for selectively discharging articles from a conveyor system, including a conveyor to convey the articles in a path of travel. A rotatable discharge member is mounted for rotation above the conveyor and includes a plurality of parallel grooves that extend longitudinally of the path of travel. Each article, as it moves along the conveyor, enters and is stopped within one of the grooves, and the discharge member is then rotated by a pair of cooperating drive units to discharge the article laterally from the conveyor. A first of the drive units includes a fluid cylinder that operates to rotate the discharge member through an arc that is less than the arc between adjacent grooves, and the second drive unit includes a cam mechanism which completes the indexing of the discharge member while the first drive unit is returned to its original position. A locking mechanism can be incorporated with the second drive unit to lock the discharge member in the indexed position.

8 Claims, 2 Drawing Sheets

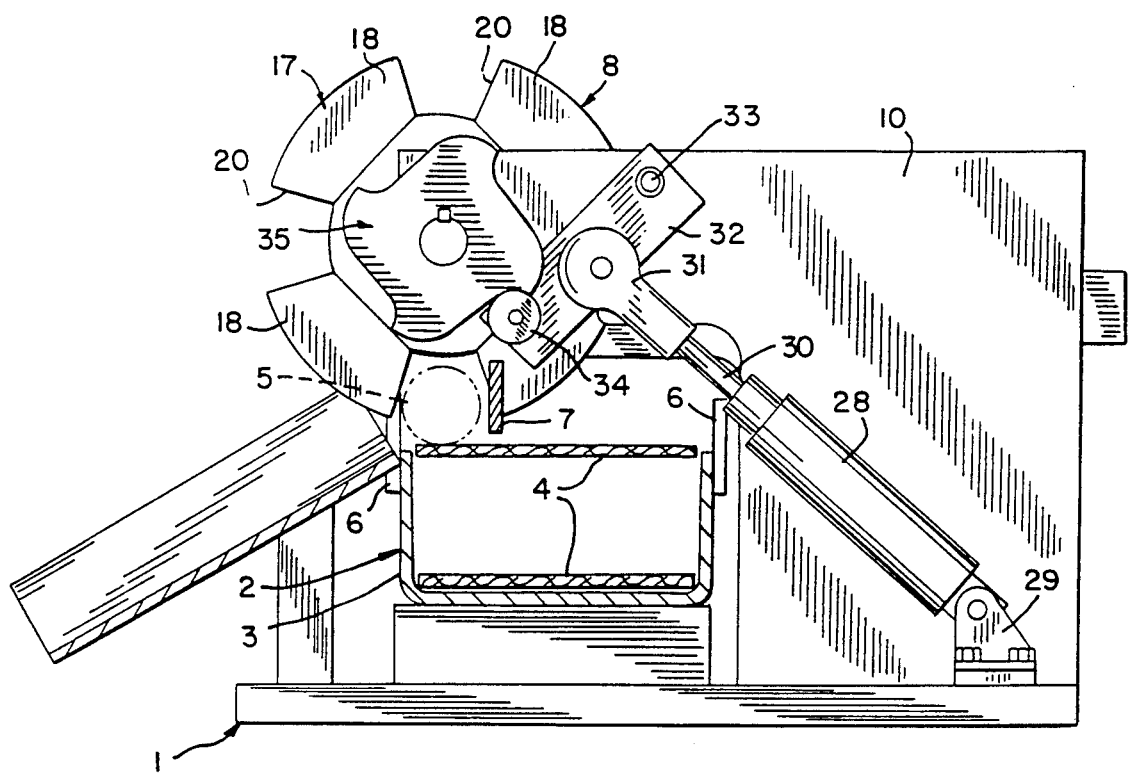
FIG. 3
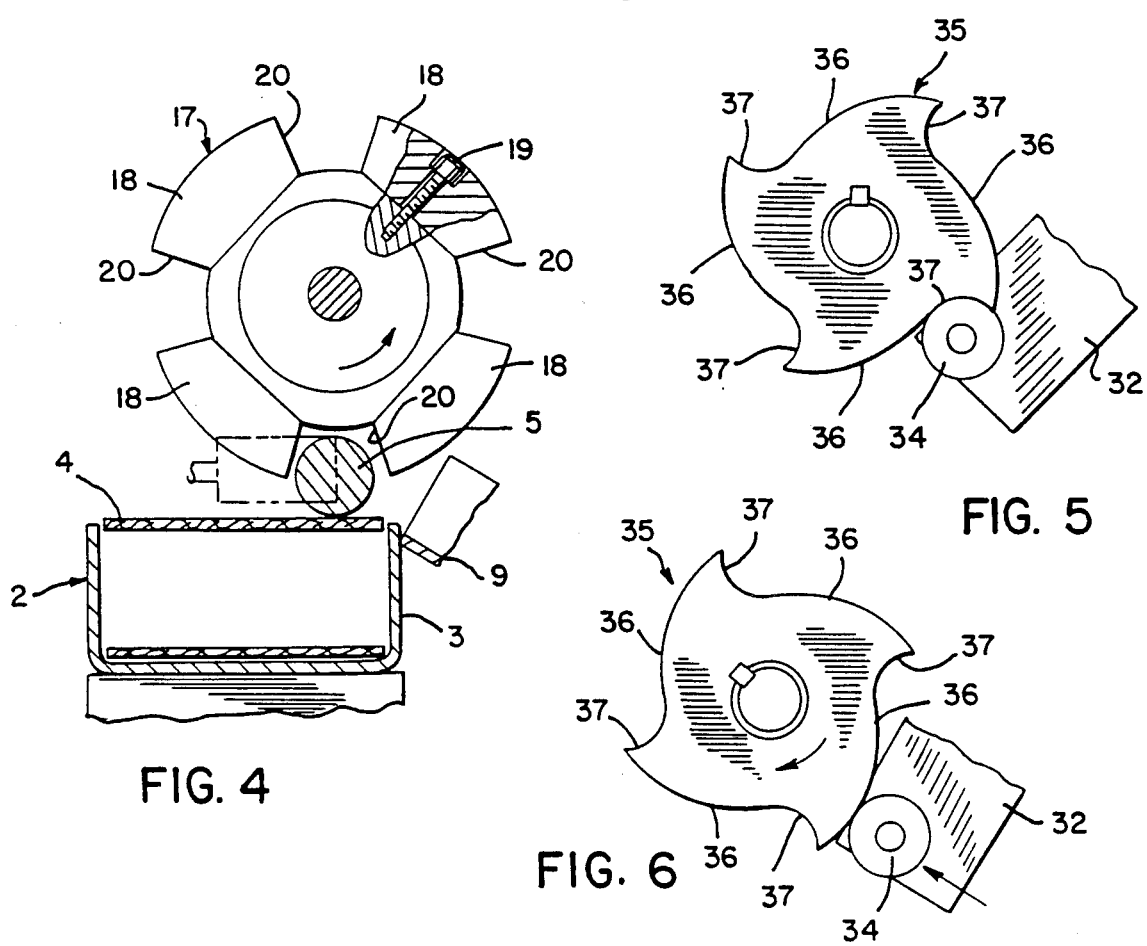
FIG. 4
FIG. 5
FIG. 6

APPARATUS FOR SELECTIVELY DISCHARGING ARTICLES FROM A CONVEYOR SYSTEM

BACKGROUND OF THE INVENTION

High speed conveying systems can be used to convey small parts or articles in a program sequence between various working stations where working operations can be performed on the article. In a typical conveyor system, it may be desired to discharge article at various locations along the length of conveyor. In this type of system, the articles may include a bar code, and a bar code reader located above the conveyor will read the code on the articles and thereby actuate the discharge mechanisms to discharge the articles at the desired locations along the length of the conveyor.

With high speed conveying systems, it is important that the discharge mechanism is operated at a sufficiently high speed so that it will not slow down the conveying system. A conventional discharge mechanism includes a reciprocating member which moves between a retracted and extended position. However, with the use of a reciprocating discharge member, the return stroke is "dead time" in which no discharge action can be accomplished. Therefore, there has been a need for a high speed discharge device which will eliminate the "dead time" normally associated with a reciprocating discharge device.

SUMMARY OF THE INVENTION

The summary of the invention is directed to a high speed mechanism for selectively discharging articles from a conveyor system. In accordance with the invention, a plurality of parts or articles are conveyed on a conveyor along a given path of travel, and a rotatable discharge member, or wheel, is mounted above the conveyor and is provided with a plurality of parallel, circumferentially-spaced grooves which extend longitudinally of the direction of movement of the conveyor.

As each article moves along the paths of travel, it is received within one of the grooves, and if it is desired to discharge that article, a stop mechanism is moved to an obstructing position to stop the article within the groove. The discharge member is then rotated by a pair of drive mechanisms to discharge the article from the conveyor to a discharge site. The mechanism for rotating the discharge member includes a first reciprocating drive unit, such as a pneumatic cylinder unit, which rotates the discharge member from a receiving position, where one of the grooves is aligned with the path of travel of the articles, to an intermediate position where the next succeeding groove is located short of the path of travel. The second drive unit, which includes a cam mechanism, then rotates the discharge member from the intermediate position to a second receiving position where the succeeding groove is aligned with the path of travel of the article. With the drive of the invention, the reciprocating first drive unit is returned to its original position while the indexing of the discharge member is being completed by the second drive unit so there is no delay for the return stroke of the reciprocating drive unit.

The drive mechanism also includes a locking mechanism which will lock the drive member or wheel in the indexed or receiving position. The locking device can take the form of a notch located at the end of a cam surface on the cam mechanism, and which is engaged by a follower that is actuated by the second drive unit.

In operation, when it is desired to discharge an article from the conveyor system, the stop mechanism is moved to the obstructing position to stop the article within the groove in the discharge wheel. The second drive unit is then actuated to disengage the follower from the notch in the cam surface to release the discharge wheel for rotation, and simultaneously the first drive unit is operated to rotate the discharge wheel through an arc from the receiving position to an intermediate position. Operation of the two drive units are then reversed with the reciprocating first drive unit being returned to its original position, while the second drive unit exerts a force through the follower and the cam surface to further rotate the discharge wheel to the next indexed position in which the next succeeding groove is positioned in alignment with the path of travel of the articles. As the discharge member moves to the second indexed position, the article will be discharged laterally from the first groove to a discharge site.

In certain installations, depending on the speed of operation of the system and the configuration of the articles and the rotatable discharge member, the articles can be discharged "on the fly" without being momentarily stopped in alignment with the discharge member. In this case, a sensor acts to sense the position of the leading end of the article as the article moves on the conveyor beneath the discharge member, and the sensor will then activate the discharge member before the leading end of the article passes beyond the discharge member.

The discharge mechanism of the invention has particular application for high speed conveying systems, and will index the rotatable discharge member without a delay as would normally occur when using a reciprocating discharge member or pusher. Because of this, the entire speed of the conveying system can be increased.

Other objects and advantages will appear in the course of the following descriptions:

DESCRIPTION OF THE DRAWINGS

The drawings illustrate the best mode presently contemplated of carrying out the invention.

FIG. 3 is an end view taken along lines 3—3 of FIG. 1;

FIG. 4 is a view of the rotatable discharge member taken along line 4—4 of FIG. 1, with parts broken away;

FIG. 5 is an end view of the cam with the follower in the locked position; and

FIG. 6 is a view similar to FIG. 5 showing the follower in the unlocked position.

DESCRIPTION OF THE ILLUSTRATED EMBODIMENT

Figure 1:
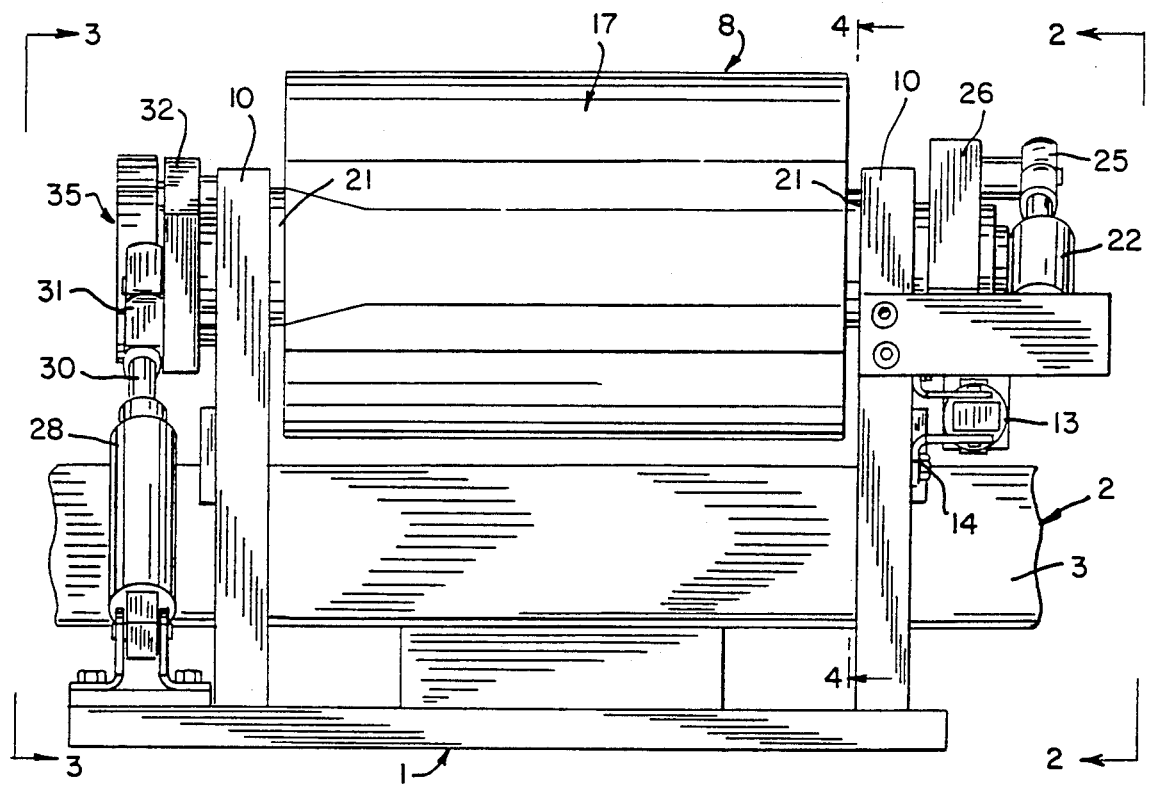
FIG. 1 is a front elevation of the discharge mechanism of the invention.

The drawings illustrate an apparatus for discharging or ejecting articles laterally from a conveying system. The apparatus includes a supporting structure or frame 1, and a conveyor 2 is mounted on frame 1. Conveyor 2 is a conventional type including a generally U-shaped frame 3, and a belt 4 is mounted for endless travel on frame 3.

A plurality of articles or parts 5 are conveyed on conveyor 2. As shown in the drawings, parts 5 are in the form of elongated cylinders, but it is contemplated that the articles 5 can have any desired shape or configuration.

Figure 2:
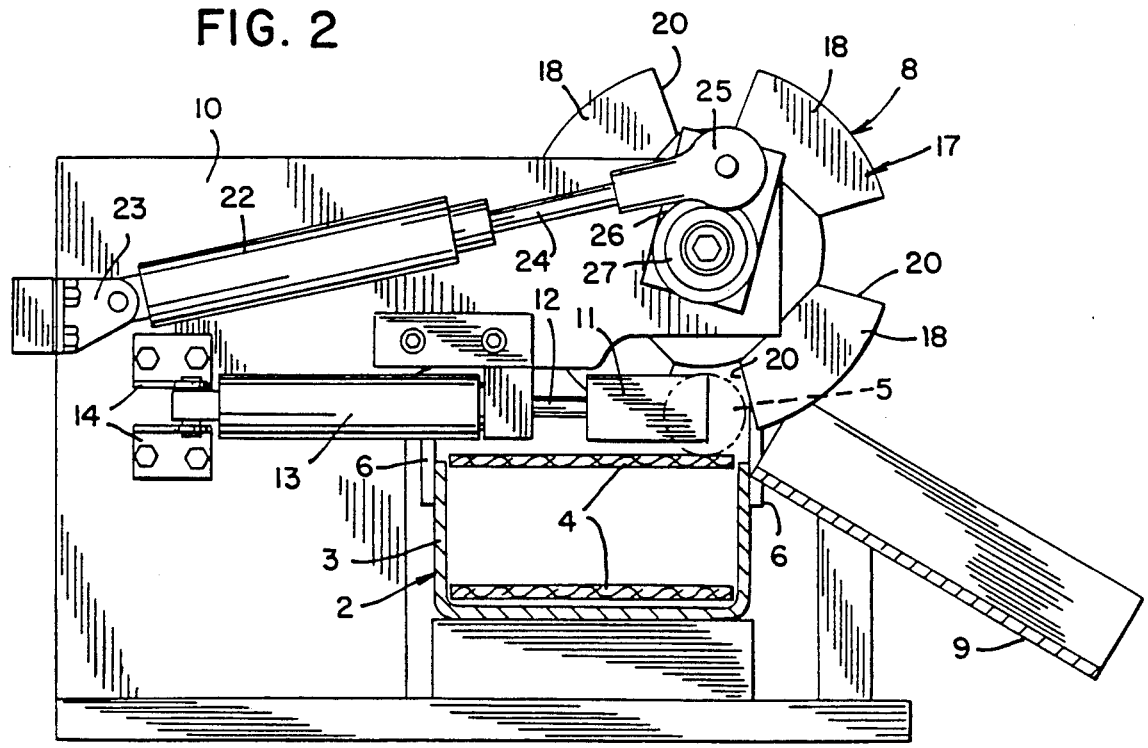
FIG. 2 is an end view taken along line 2—2 of FIG. 1.

As shown in FIGS. 2 and 3, side guides 6 are mounted along the sides of conveyor 2, and an intermediate guide rail 7 is mounted above belt 4 and rail 7, in combination with one of the guides 6, defines a path of travel for the parts 5 as best shown in FIG. 3.

A rotatable discharge mechanism 8 is mounted above conveyor 2 and operates to selectively discharge the parts 5 laterally from the conveyor into an inclined chute 9 which extends laterally from the side edge of conveyor 2. The discharge mechanism 8 includes a pair of vertical, parallel side plates 10 which extend upwardly from supporting structure 1. In order to stop a part 5 from the moving conveyor belt 4, a stop mechanism is associated with one of the side plates 10. The stop mechanism includes a stop block 11 which is mounted on the end of a piston rod 12 that is slideable within pneumatic cylinder 13. The rear end of cylinder 13 is attached through mounting brackets 14 to one of the side plates 10. By introducing a fluid, such as air, into cylinder 13, piston rod 12 will be extended to move the block 11 to an obstructing position where it is located in the path of travel of the parts 5 on belt 4. With the stop block in the obstructing position, the part 5 moving on belt 4 will engage the stop, thereby properly aligning the part with the discharge mechanism 8.

Discharge mechanism 8 includes a wheel or drum 17 having a plurality of longitudinally extending ribs 18 which are secured to the outer surface of wheel 17 by screws 19. The spaces between adjacent ribs 18 define grooves or passages 20. Each groove 20 will be indexed to a lower receiving position or station where the groove is aligned with the path of travel of parts 5 on belt 4 as best seen in FIGS. 2 and 3.

Grooves 20 are configured to receive the articles 5. As illustrated, the parts 5 are in the form of elongated cylinders and thus grooves 20 are elongated to receive the parts. As best seen in FIG. 4, the discharge wheel includes four grooves 20 which are spaced 90° apart.

The discharge mechanism 8 is mounted for rotation by stub shafts 21 which extend outwardly from the ends of the drum 17 and are journaled within suitable brushings in side plates 10.

Discharge mechanism 8 is adapted to be rotated to index each groove 20 to the downwardly facing receiving position where it is aligned with the path of travel of parts 5. The rotating mechanism includes a fluid cylinder 22, such as an air cylinder, having one end pivotally connected to lugs 23 which are mounted on one of the side plates 10. A piston rod 24 extends from the opposite end of cylinder 22 and is attached via a clevis 25 to one end of arm 26. The opposite end of arm 26 is journaled on one of the stub shafts 21 by a one-way roller clutch bearing assembly 27. Bearing assembly 27 is a conventional type manufactured by Torrington Corp. under the trade name of DC Roller Clutch, and provides a driving connection between arm 26 and shaft 21 when rotated in one direction, and provides a disengaged connection between the members when rotated in the opposite direction. With this construction, retraction of piston rod 24 will act to rotate shaft 21 and discharge member 8 through an arc which is less than the arc between adjacent grooves 20, and generally through an arc of about 45° so that the groove 20 which was in the receiving position, will be moved to an intermediate position short of the next indexed position. Extension of the piston rod 24 will cause arm 26 to pivot relative to shaft 21 and discharge member 8 due to the disengagement of the roller clutch 27.

The drive also includes a second cylinder unit, such as a pneumatic cylinder 28, which is pivotally mounted to lugs 29 secured to the opposite side plate 10. Piston rod 30 is mounted for sliding movement relative to cylinder 28, and the outer end of piston rod 30 is connected via clevis 31 to the central portion of arm 32. The upper end of arm 32 is mounted for pivotal movement relative to side plate 10 on pivot 33, while a follower or roller 34 is mounted for rotation on the opposite or lower end of arm 32.

As shown in FIG. 3, follower 34 is normally engaged with a cam 35 that is secured to shaft 21 of discharge mechanism 8.

As best illustrated in FIG. 3, cam 35 is provided with four generally curved cam surfaces 36 and a notch or recess 37 is located at the end of each cam surface. Engagement of follower 34 with one of the notches 37, as seen in FIG. 5, will lock the discharge wheel 17 in one of the indexed positions where one of the grooves 20 faces downwardly in the receiving position.

Retraction of piston rod 30 will move follower 34 out of notch 37 to thereby release the locking engagement and enable the discharge wheel 17 to be rotated. After the discharge wheel 17 has been rotated to an intermediate position by operation of cylinder 22, piston rod 30 is extended, bringing follower 34 into engagement with cam surface 36. The force exerted through roller 34 against the cam surface 36 will continue the rotation of discharge wheel 17 to the next indexed position where the follower 34 will engage the next succeeding notch 37 to lock the discharge wheel at that location.

OPERATION

In operation, one or more discharge mechanisms 8 may be located along the length of conveyor 2, and parts or articles 5 are conveyed on the conveyor and pass through the downwardly facing slot 20 of wheel 17 of each discharge mechanism. The parts 5 can be marked with individual bar codes and a bar code reader can read the code on the parts being conveyed. If, according to the programmed sequence, a given part is to be discharged at that discharge station, cylinder 13 is operated to move the stop block 11 to the obstructing position to stop the part in the downwardly facing groove 20 of wheel 17. Cylinder 28 is then operated to retract follower 34 from the notch 37 in cam 35, and simultaneously cylinder 22 is retracted to rotate the discharge wheel 17 through an arc of about 45°. As the wheel 17 rotates, the part 5 contained within groove 20 will be ejected laterally from the conveyor 2 and through chute 9 to a discharge site.

After cylinder 22 has moved through its stroke of movement, the piston rod 24 is returned to its original extended position, and due to the one-way clutch-bearing 27, discharge wheel 17 will not be rotated during this return stroke. Simultaneously, piston rod 30 of cylinder 28 is extended moving follower 34 into engagement with cam surface 36. The fluid pressure in cylinder 28 will force the follower 34 against the cam surface, and the cam surface is designed so that this force will act to rotate the cam 35 and discharge wheel 17 in the next indexed position. When follower 34 reaches the end of cam surface 36 it will fall into notch 37 to thereby lock the discharge wheel 17 in the next indexed position where the the next succeeding groove 20 faces downwardly in the receiving position to receive a part 5.

The mechanism of the invention provides a high speed discharge or transfer of articles from the conveyor and eliminates the usual "dead time" that accompanies the operation of a conventional reciprocating discharge member. With the invention, the second phase of indexing movement of the discharge mechanism is accomplished during the return stroke of the reciprocating drive member.

Various modes of carrying out the invention are contemplated as being within the scope of the following claims particularly pointing out and distinctly claiming the subject matter which is regarded as the invention.

We claim:

1. A mechanism for selectively discharging articles from a conveyor system, comprising a conveyor to convey a plurality of articles in a path of travel, a rotatable discharge member mounted for rotation with respect to said conveyor and having a plurality of grooves extending longitudinally of the direction of movement of said conveyor, a reciprocating first drive means operably connected to said discharge member and constructed and arranged to move from a primary position to a secondary position and rotate the discharge member from a first indexed position where a first groove is aligned with said path of travel to an intermediate position where a next succeeding second groove is positioned short of said path of travel, and second drive means operably connected to said discharge member for rotating said discharge member from said intermediate position to a second indexed position while said first drive means is returned from said secondary position to said primary position, said second drive means including cam means connected to said discharge member and a driving member engaged with said cam means, said cam means comprising a cam surface and said driving member comprising a follower engaged with said cam surface, said second drive means also including means for exerting a force through said follower against said cam surface to thereby rotate said discharge member.

2. The apparatus of claim 1, wherein said grooves are spaced equally around the circumference of said discharge member.

3. The apparatus of claim 1, wherein said first drive means includes a one-way clutch mechanism constructed and arranged to provide a driving connection between said first drive means and said discharge member when said first drive means moves from the primary to the secondary position, and to provide a disengaged connection between said first drive means and the discharge member when said first drive means moves from the secondary position to the primary position.

4. The apparatus of claim 1, and including a plurality of said cam surfaces with the number of cam surfaces corresponding to the number of said grooves.

5. An apparatus for selectively discharging articles from a conveyor system, comprising a conveyor to convey a plurality of articles in a path of travel, a rotatable discharge member mounted for rotation above the conveyor and having a plurality of circumferentially-spaced, parallel grooves in the outer surface thereof, each groove being movable to a downwardly facing receiving station where said groove is aligned with said path of travel, stop means for stopping an article on said conveyor when said article is in a first groove at said receiving station, a reciprocating first fluid cylinder unit, one-way clutch means interconnecting said first cylinder unit and said discharge member, said clutch means being constructed and arranged to provide a driving connection between said first cylinder unit and said discharge member when the cylinder unit moves in one direction and to provide a disengaged connection between said first cylinder unit and said discharge member when said first cylinder unit moves in the opposite direction, said first cylinder unit being constructed and arranged to rotate said discharge member through an arc less than the arc between adjacent grooves to discharge said article from said first groove and position a next succeeding second groove at an intermediate station short of the receiving station, a second fluid cylinder unit, a cam connected to said discharge member and having a plurality of cam surfaces, the number of cam surfaces corresponding to the number of said grooves, said cam having a plurality of notches with each notch being located adjacent a cam surface, a follower operably connected to said second cylinder unit and engaged with said cam, said second cylinder unit being constructed and arranged such that movement of said second cylinder unit from a primary position to a secondary position causes retraction of said follower from a notch to thereby release said discharge member for rotation, and operation of said second cylinder unit from said secondary position to said primary position causing said follower to engage a cam surface to rotate said cam and said discharge member and move said second groove from said intermediate station to the receiving station.

6. The apparatus of claim 5, wherein said discharge member includes four grooves which are spaced 90° apart.

7. The apparatus of claim 5, wherein said intermediate station is approximately 45° from said receiving station.

8. An apparatus for selectively discharging articles from a conveyor system, comprising a conveyor to convey a plurality of articles in a path of travel, a rotatable discharge member mounted for rotation above the conveyor and having a plurality of circumferentially spaced parallel grooves extending longitudinally of said path of travel, each groove being successively movable to a receiving station where said groove is aligned with said path of travel, reciprocating first drive means operable connected to said discharge member and movable between a first and second position, movement of said first drive means from said first position to said second position acting to rotate said discharge member through an arc of sufficient magnitude to position a next succeeding groove and an intermediate position short of said receiving station, second drive means operably connected to said discharge member for rotating said discharge member through an arc sufficient to position said succeeding groove at said receiving station, said second drive means being constructed and arranged to move each groove from said intermediate station to said receiving station while said first drive means is moving from said second position to said first position, said second drive means including a cam connected to said discharge member and having a plurality of cam surfaces and a follower engaged with said cam, said second drive means also including means for exerting a force through said follower against said cam to thereby rotate said cam and said discharge member, and one-way clutch means interconnecting said first drive means and said discharge member and constructed and arranged to provide a driving connection between said first drive means and said discharge member when said first drive means moves from the first position to the second position and to provide a disengaged connection between said first drive means and said discharge member when said first drive means moves from the second position to the first position.

* * * * *